(12) United States Patent
Mizuma

(10) Patent No.: US 11,317,030 B2
(45) Date of Patent: Apr. 26, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kenshiro Mizuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/328,939

(22) Filed: May 24, 2021

(65) Prior Publication Data
US 2021/0368106 A1 Nov. 25, 2021

(30) Foreign Application Priority Data
May 25, 2020 (JP) .............................. JP2020-090278

(51) Int. Cl.
*H04N 5/232* (2006.01)
*G06F 3/0338* (2013.01)

(52) U.S. Cl.
CPC ....... *H04N 5/23299* (2018.08); *G06F 3/0338* (2013.01); *H04N 5/23203* (2013.01)

(58) Field of Classification Search
CPC ........... H04N 5/23299; H04N 5/23203; H04N 5/232; G06F 3/0338
USPC ..................................................... 348/211.7
See application file for complete search history.

(56) References Cited

U.S. PATENT DOCUMENTS

| | | | | |
|---|---|---|---|---|
| 6,867,798 B1* | 3/2005 | Wada | ..................... | H04N 7/183 348/143 |
| 6,940,544 B2* | 9/2005 | Shimaoka | .......... | H04N 5/23203 200/329 |
| 6,977,678 B1* | 12/2005 | Wada | ................. | H04N 5/23203 348/211.99 |
| 7,750,944 B2* | 7/2010 | Arbogast | ........... | H04N 5/23203 348/211.7 |
| 7,868,919 B2* | 1/2011 | Flannery | .......... | H04N 5/232945 348/211.8 |
| 7,969,412 B2* | 6/2011 | Nagiyama | ........... | G06F 3/04883 345/156 |

(Continued)

FOREIGN PATENT DOCUMENTS

JP H08007660 B 1/1996

*Primary Examiner* — Pritham D Prabhakher
(74) *Attorney, Agent, or Firm* — Canon U.S.A., Inc. IP Division

(57) ABSTRACT

An information processing apparatus includes an acquisition unit configured to acquire first mapping information in which an amount of inclination of a joystick, used for controlling the image capturing direction, and a change speed in the image capturing direction of an image capturing apparatus are associated, and a change speed in an image capturing direction of an image capturing apparatus are associated, a determination unit configured to determine the change speed in the image capturing direction based on the amount of inclination of the joystick by a user operation and the first mapping information, and a generation unit configured to generate second mapping information in which the amount of inclination of the joystick and the change speed in the image capturing direction are associated, based on the change speed in the image capturing direction determined by the determination unit during a predetermined period.

12 Claims, 12 Drawing Sheets

(56) References Cited

U.S. PATENT DOCUMENTS

| | | | | |
|---|---|---|---|---|
| 8,477,096 | B2* | 7/2013 | Nagiyama | G06F 3/0481 |
| | | | | 345/156 |
| 9,001,205 | B2* | 4/2015 | Nordenfelt | H04N 5/23216 |
| | | | | 348/135 |
| 9,930,249 | B2* | 3/2018 | Yokoyama | H04N 5/23216 |
| 9,936,168 | B2* | 4/2018 | Nordenfelt | H04N 5/232945 |
| 10,126,813 | B2* | 11/2018 | Rainisto | G06F 3/013 |
| 10,354,407 | B2* | 7/2019 | Lablans | H04N 5/2251 |
| 2002/0001034 | A1* | 1/2002 | Shimaoka | H04N 5/23203 |
| | | | | 348/211.99 |
| 2007/0226646 | A1* | 9/2007 | Nagiyama | G06F 3/04883 |
| | | | | 715/784 |
| 2009/0262193 | A1* | 10/2009 | Anderson | H04N 5/23299 |
| | | | | 348/157 |
| 2013/0100279 | A1* | 4/2013 | Nordenfelt | H04N 5/232933 |
| | | | | 348/135 |
| 2015/0173601 | A1* | 6/2015 | Ogura | A61B 3/0075 |
| | | | | 351/206 |
| 2015/0181174 | A1* | 6/2015 | Nordenfelt | H04N 5/23216 |
| | | | | 348/143 |
| 2017/0173262 | A1* | 6/2017 | Veltz | A61B 5/0022 |

* cited by examiner

INFORMATION PROCESSING APPARATUS, INFORMATION PROCESSING METHOD, AND STORAGE MEDIUM

BACKGROUND

Field of the Invention

The present invention relates to an information processing apparatus, an information processing method, and a storage medium.

Description of the Related Art

A joystick has heretofore been used as an input device that controls a pan/tilt operation (PT operation) of a remote camera to be used at a site for moving image distribution or video production. In the case of performing the PT operation of a camera using a joystick, a degree of inclination of the joystick and a PT speed are controlled in association with each other.

A joystick is used not only for the PT operation of a camera, but also for an operation of a cursor of a computer, a movement operation of a character in a game, and the like. Mapping of an inclination of a joystick and an operation speed of an object to be operated has options such as linear mapping and curve mapping. Japanese Published Examined Application No. H08-007660 discusses a mapping method of using a sigmoid function for setting an inclination in a lowest operation speed range and an inclination in a highest operation speed range to be more gradual as a mapping in the cursor operation of the computer using the joystick.

However, in the technique discussed in Japanese Published Examined Application No. H08-007660, the mapping for the joystick is not calibrated and the same mapping is used for all users even when the joystick operation is performed differently by each user. Accordingly, some users may feel that the joystick is not user-friendly.

Accordingly, the present invention is directed to a technique of performing an appropriate mapping of an operation amount of an input device and an operation speed of a target object in consideration of characteristics of an operation on the input device by each user.

SUMMARY

According to an aspect of the present invention, an information processing apparatus includes a computer executing instructions that, when executer by the computer, causes the computer to acquire first mapping information in which an amount of inclination of a joystick, used for controlling an image capturing direction, and a change speed in the image capturing direction of an image capturing apparatus are associated, determine the change speed in the image capturing direction, based on the amount of inclination of the joystick by a user operation and the first mapping information, and generate second mapping information in which the amount of inclination of the joystick and the change speed in the image capturing direction are associated, based on the determined change speed in the image capturing direction during a predetermined period.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

Exemplary embodiments to be described below are merely examples as implementation forms of the present invention and should be appropriately modified or changed according to the configuration of an apparatus to which the present invention is applied and various conditions. The present invention is not limited to the following exemplary embodiments.

Figure 1:
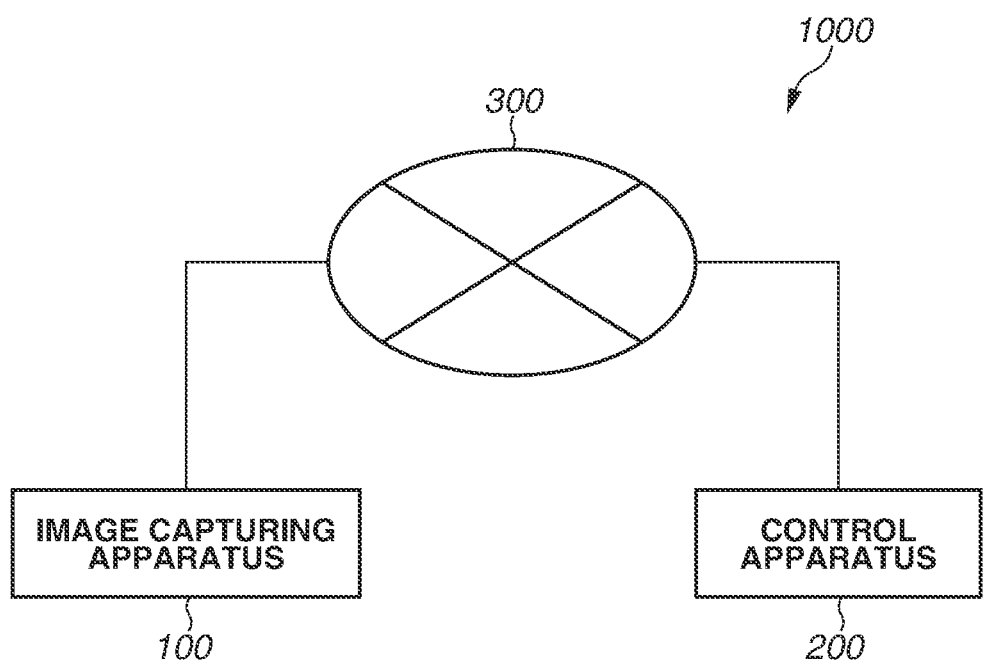
FIG. 1 is a block diagram illustrating an example of a camera system according to one or more aspects of the present disclosure.

FIG. 1 is a block diagram illustrating a configuration example of a camera system 1000 according to a first exemplary embodiment. The camera system 1000 includes an image capturing apparatus 100 and a control apparatus 200. The image capturing apparatus 100 and the control apparatus 200 are communicably connected via a network 300.

The network 300 is composed of, for example, a plurality of routers, switches, and cables compatible with Ethernet® communication standards. The communication standards, the size, and the configuration of the network 300 are not particularly limited as long as the image capturing apparatus 100 and the control apparatus 200 can communicate with each other. The network 300 may be implemented by the Internet, a wired local area network (LAN), a wireless LAN, a wide area network (WAN), or a combination thereof.

The image capturing apparatus 100 is a network camera (hereinafter, simply referred to as a "camera") that captures image data or moving image data through a lens. In the present exemplary embodiment, the camera 100 is a pan/tilt/zoom (PTZ) camera configured to change an image capturing area. The camera 100 can transmit the captured image data or the like to a client apparatus via the network 300 in response to a request from a client. Further, the camera 100 may actively transmit image data or the like to the client apparatus to which the camera 100 is connected in advance. In this case, the client apparatus may be the control apparatus 200.

The control apparatus 200 is an information processing apparatus composed of a general terminal apparatus such as a personal computer (PC), a smartphone, or a tablet PC. The control apparatus 200 may be a dedicated controller apparatus for operating a remote camera.

The control apparatus 200 can perform a PTZ control for the camera 100. The control apparatus 200 may be a camera control apparatus that performs not only the PTZ control, but also settings and control operations, such as focusing and white balancing, for the camera 100.

Figure 2:
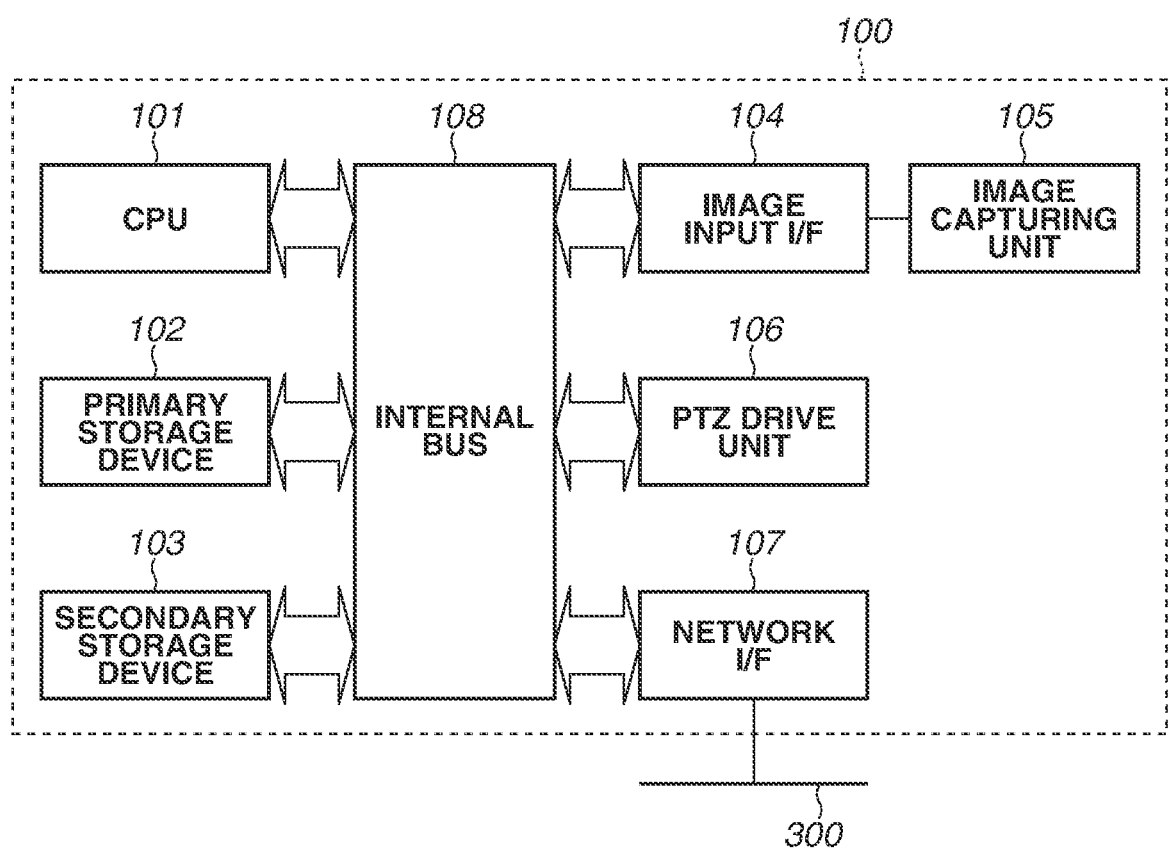
FIG. 2 is a block diagram illustrating a hardware configuration example of an image capturing apparatus according to one or more aspects of the present disclosure.

FIG. 2 is a block diagram illustrating a hardware configuration example of the camera 100.

The camera 100 includes a central processing unit (CPU) 101, a primary storage device 102, a secondary storage device 103, an image input interface (I/F) 104, an image capturing unit 105, a PTZ drive unit 106, and a network I/F 107. The CPU 101, the primary storage device 102, the secondary storage device 103, the image input I/F 104, the image capturing unit 105, the PTZ drive unit 106, and the network IF 107 are each connected to an internal bus 108.

The CPU 101 controls operations in the camera 100 in an integrated manner.

The primary storage device 102 is, for example, a high-speed writable storage device as typified by a random access memory (RAM). For example, an operating system (OS), various programs, and various data are loaded into the primary storage device 102. The primary storage device 102 is also used as a work area for the CPU 101 to execute the OS, various programs, and the like.

The functions and processing of the camera 100 can be implemented by the CPU 101 reading out programs stored in the primary storage device 102 and executing the programs.

The secondary storage device 103 is, for example, a nonvolatile storage device as typified by a hard disk drive (HDD), a flash memory, and a secure digital (SD) card, and may be configured to be attachable and detachable. The secondary storage device 103 can be used not only as a permanent storage area for the OS, various programs, various data, and the like, but also as a temporary storage area for various data and the like.

The image input I/F 104 is an interface for inputting image data from the connected image capturing unit 105.

The image capturing unit 105 includes a lens unit and an image sensor that constitute an image capturing optical system. The image sensor includes a charge-coupled device (CCD) sensor and a complementary metal oxide semiconductor (CMOS) sensor, and converts an image formed on a light receiving surface of the sensor into an electrical signal.

The PTZ drive unit 106 controls a motor or the like to control the PTZ operation of the camera 100.

The network I/F 107 is an interface for connecting to the network 300. A network communication from the control apparatus 200 is transmitted to various programs via the network I/F 107.

Figure 3:
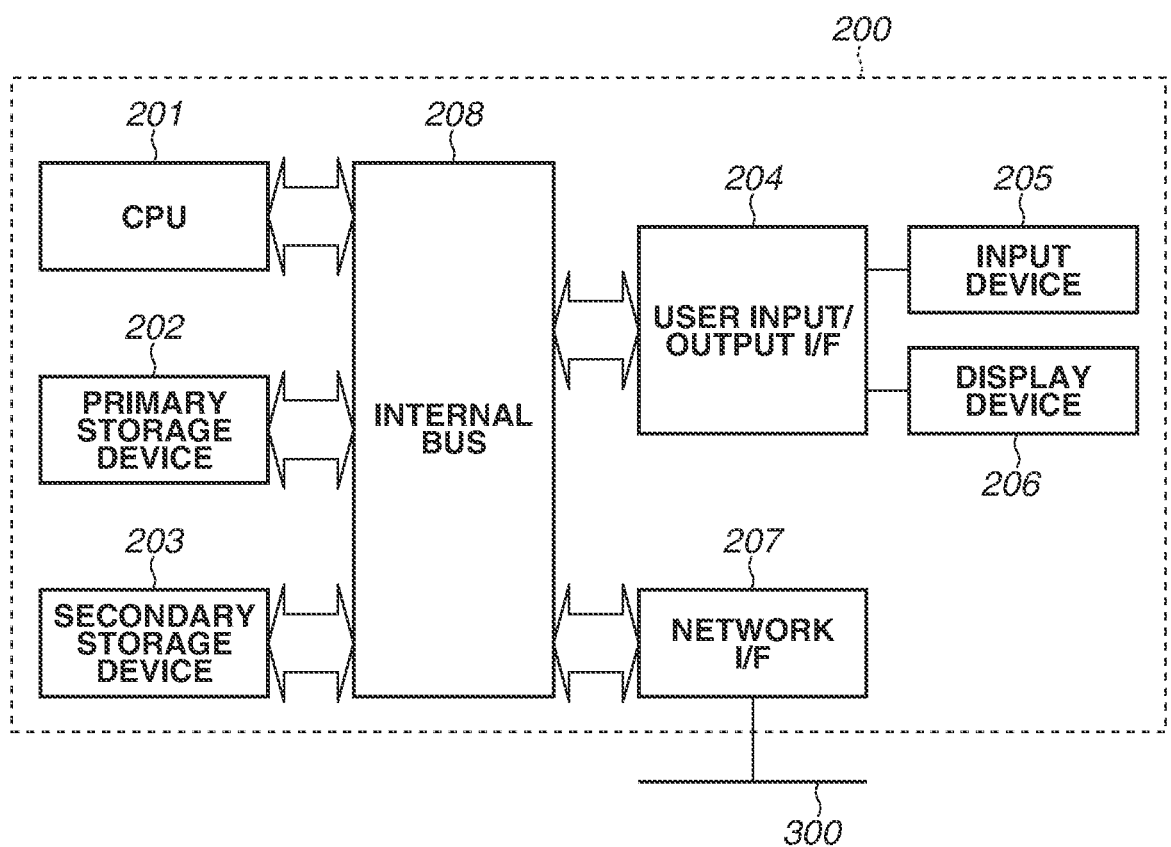
FIG. 3 is a block diagram illustrating a hardware configuration example of a control apparatus according to one or more aspects of the present disclosure.

FIG. 3 is a block diagram illustrating a hardware configuration example of the control apparatus 200.

The control apparatus 200 includes a CPU 201, a primary storage device 202, a secondary storage device 203, a user input/output I/F 204, an input device 205, a display device 206, and a network I/F 207. The CPU 201, the primary storage device 202, the secondary storage device 203, the user input/output I/F 204, the input device 205, the display device 206, and the network I/F 207 are each connected to an internal bus 208.

The control apparatus 200 has a configuration including the user input/output I/F 204, the input device 205, and the display device 206, in place of the image input IF 104, the image capturing unit 105, and the PTZ drive unit 106 illustrated in FIG. 2. The configurations of the CPU 201, the primary storage device 202, the secondary storage device 203, and the network IF 207 are respectively similar to the configurations of the CPU 101, the primary storage device 102, the secondary storage device 103, and the network I/F 107 illustrated in FIG. 2.

The user input/output I/F 204 is an interface for the control apparatus 200 to receive an operation from a user and present a video image and the like to the user. For example, a touch operation, a mouse operation, an audio input, and processing using a captured image by the user are transmitted to various programs via the user input/output I/F 204.

The input device 205 is an input device that can be operated by the user, and includes a joystick capable of inputting information by inclining a stick. The joystick corresponds to the input device 205 (hereinafter, also referred to as the "joystick 205") whose operation amount can be adjusted by the user. If the control apparatus 200 is a PC or the like, the joystick 205 is connected via a universal serial bus (USB) or the like, and an input value depending on the inclination of the stick can be acquired by the CPU 201. If the control apparatus 200 is a controller apparatus or the like, the joystick 205 is mounted on the apparatus, and an input value can be acquired by the CPU 201. Values that can be acquired by the CPU 201 will be described below.

The input device 205 may include an input/output (I/O) device, including a pointing device, such as a keyboard or a mouse, that can be operated by the user.

The display device 206 is a device for displaying a user interface (UI) image, an image captured by the camera 100, and the like on a screen. The display device 206 includes a monitor such as a liquid crystal display (LCD) or an organic electroluminescence (EL) display.

The functions and processing of the control apparatus 200 to be described below are implemented by the CPU 201 reading out programs stored in the primary storage device 202 and executing the programs.

Figure 4:
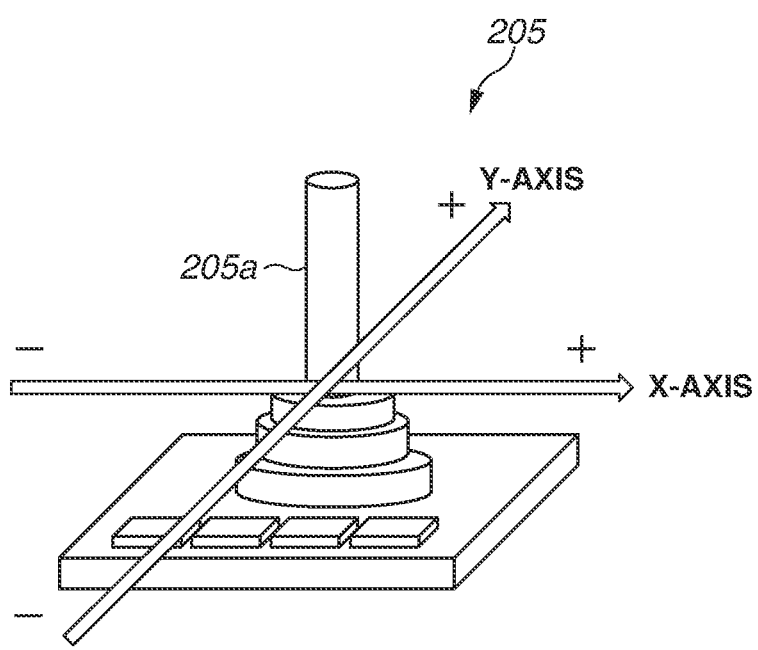
FIG. 4 is a schematic diagram illustrating an example of a joystick.

FIG. 4 is a schematic diagram illustrating an example of the joystick 205.

The joystick 205 includes a stick portion 205a. The stick portion 205a serves as an operation portion that can be inclined and rotated, and is operated by being gripped by the user. The user can operate the joystick 205 by inclining the stick portion 205a from a neutral position. As values indicating the operation amount of the joystick 205, two types of values, i.e., the amount of inclination in a horizontal direction and the amount of inclination in a vertical direction, can be acquired. In the joystick 205 illustrated in FIG. 4, an X-axis is taken in the horizontal direction and a Y-axis is taken in the vertical direction. The right direction of the X-axis corresponds to the plus side, and the left direction of the X-axis corresponds to the minus side. The upward direction (back direction) of the Y-axis corresponds to the plus side, and the downward direction (front direction) of the Y-axis corresponds to the minus side.

The X-axis corresponds to an inclination axis in the horizontal direction of the stick portion 205a. When the stick portion 205a is inclined in the horizontal direction, the degree of inclination of the stick portion 205a can be expressed in coordinates on the X-axis. In the present exemplary embodiment, this value is hereinafter referred to as "x". The value x is positive when the stick portion 205a is inclined rightward, and the value x is negative when the stick portion 205a is inclined leftward.

The Y-axis corresponds to an inclination axis in the vertical direction of the stick portion 205a. When the stick portion 205a is inclined in the vertical direction, the degree of inclination of the stick portion 205a can be expressed in coordinates on the Y-axis. In the present exemplary embodiment, this value is hereinafter referred to as "y". The value y is positive when the stick portion 205a is inclined upward, and the value y is negative when the stick portion 205a is inclined downward.

When the joystick 205 is located at the neutral position, (x, y)=(0, 0) holds. An absolute value obtained when the stick portion 205a is fully inclined in the vertical direction is equal to that when the stick portion 205a is fully inclined in the horizontal direction.

In the present exemplary embodiment, the control apparatus 200 controls the inclination direction of the joystick 205 in association with the turning direction (pan direction, tilt direction) of the camera 100. Further, the control apparatus 200 controls the amount of inclination of the joystick 205 and the turning speed (pan speed, tilt speed) of the camera 100 in association with each other. In the latter case, the operation feeling of the joystick 205 is greatly affected by mapping of a table in which the amount of inclination of the joystick 205 and the turning speed of the camera 100 are associated with each other.

Mapping of the amount of inclination of the joystick 205 and the operation speed (PT speed) of the camera 100 has options such as linear mapping and curve mapping. Curve mapping is characterized in that a change in the operation speed of the camera 100 with respect to a change in the amount of inclination of the joystick 205 is more gradual in an area with a smaller degree of inclination of the curve, and a change in the operation speed of the camera 100 with respect to a change in the amount of inclination of the joystick 205 is steeper in an area with a larger degree of inclination of the curve. In other words, the operation speed of the camera 100 can be more easily adjusted in an area with a smaller degree of inclination of the curve, and the operation speed of the camera 100 cannot be easily adjusted in an area with a larger degree of inclination of the curve.

Accordingly, in the mapping of the amount of inclination of the joystick 205 and the operation speed of the camera 100, a speed adjustment in a frequently used speed range can be more easily performed by setting the inclination of the joystick 205 in the operation speed range frequently used by the user to be more gradual and by setting the inclination of the joystick 205 in the less frequently used operation speed range to be steeper.

Accordingly, in the present exemplary embodiment, the control apparatus 200 acquires data indicating characteristics of a user operation on the joystick 205, and creates a table in which the amount of inclination of the joystick 205 is associated with the operation speed of the camera 100 based on the acquired data. More specifically, the control apparatus 200 calculates the operation speed range frequently used by the user during image capturing with the camera 100 based on the acquired data. Further, the control apparatus 200 performs mapping for the joystick 205 so that a change in the operation speed of the camera 100 with respect to a change in the amount of inclination of the joystick 205 in the calculated operation speed range becomes more gradual.

The present exemplary embodiment illustrates a case where the control apparatus 200 operates as an information processing apparatus that creates a table in which the operation amount of the joystick 205 is associated with the operation speed of the camera 100. However, the camera 100, a general PC, or another apparatus that is communicably connected to the camera 100 may operate as the above-described information processing apparatus.

Figure 5:
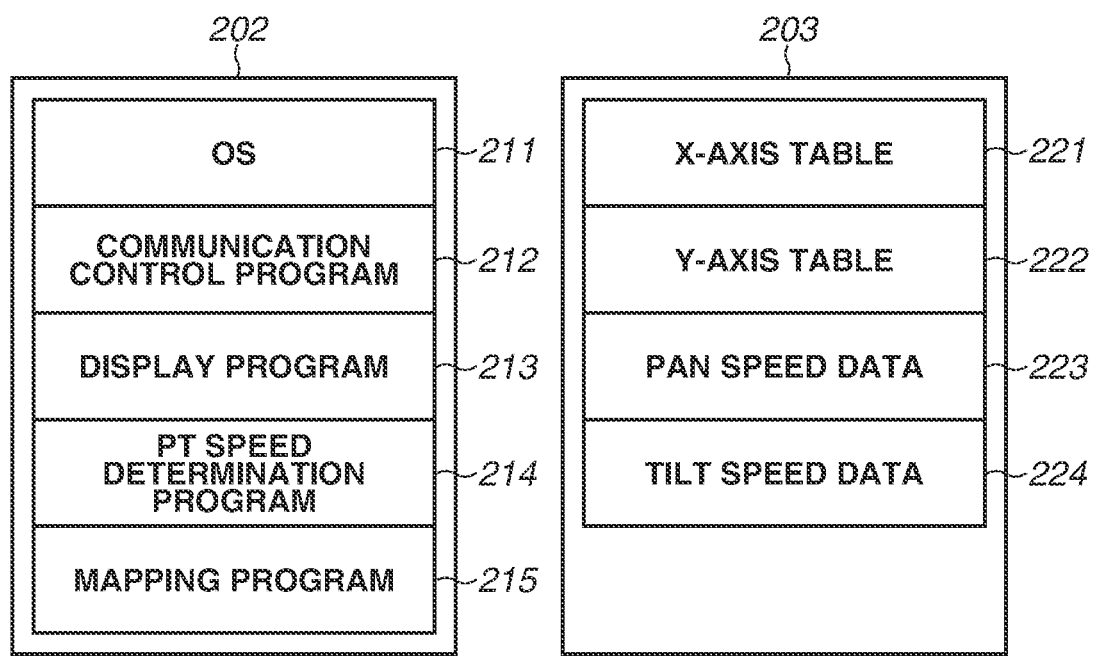
FIG. 5 is a block diagram illustrating a configuration example of a storage device of the control apparatus according to one or more aspects of the present disclosure.

FIG. 5 illustrates examples of various programs and various data stored in the primary storage device 202 and the secondary storage device 203 of the control apparatus 200 illustrated in FIG. 3.

An OS 211, a communication control program 212, a display program 213, a PT speed determination program 214, and a mapping program 215 are loaded into the primary storage device 202.

The secondary storage device 203 stores an X-axis table 221, a Y-axis table 222, pan speed data 223, and tilt speed data 224.

The present exemplary embodiment illustrates a case where the X-axis table 221, the Y-axis table 222, the pan speed data 223, and the tilt speed data 224 are stored in the secondary storage device 203. Alternatively, the X-axis table 221, the Y-axis table 222, the pan speed data 223, and the tilt speed data 224 may be stored as temporary information in the primary storage device 202.

The OS 211 is a basic program for controlling the overall operation of the control apparatus 200. The locations (addresses) and sizes of the various programs (212 to 215) in the primary storage device 202 are managed by the OS 211.

The communication control program 212 is a program for controlling the communication with the camera 100 from the network I/F 207 via the network 300. Examples of contents of the communication include transmission of a request for acquiring an image captured by the image capturing unit 105 of the camera 100, and transmission of a PTZ control request to the PTZ drive unit 106 of the camera 100. The requests may be transmitted to the camera 100 using general communication protocols such as a hypertext transfer protocol (HTTP).

The display program 213 is a program for displaying video data acquired from the camera 100, icons for controlling the camera 100, and the like on the display device 206 through the user input/output I/F 204 included in the control apparatus 200. Further, the display program 213 can receive, as an input from the user, an input made using an external device, such as a mouse or a keyboard, and a touch operation or the like when the display device 206 is a touch display.

The PT speed determination program 214 is a program for determining the PT speed and the PT direction of the camera 100 corresponding to the inclination of the joystick 205 when the joystick 205 is inclined and operated. The mapping program 215 is a program for creating the X-axis table 221 and the Y-axis table 222. In the present exemplary embodiment, the mapping program 215 is a program for calibrating the default table and updating the X-axis table 221 and the Y-axis table 222.

The X-axis table 221 is a table in which the amount of inclination in the X-axis of the joystick 205 is associated with the pan speed of the camera 100. The X-axis table 221 is a table obtained by linearly mapping the relationship between the degree of inclination of the joystick 205 and the pan speed of the camera 100 by default.

The Y-axis table 222 is a table in which the amount of inclination in the Y-axis of the joystick 205 is associated with the tilt speed of the camera 100. The Y-axis table 222 is a table obtained by linearly mapping the relationship between the degree of inclination of the joystick 205 and the tilt speed of the camera 100 by default.

The pan speed data 223 is data on the pan speed recorded when a pan operation is carried out by the user. The tilt speed data 224 is data on the tilt speed when a tilt operation is carried out by the user. The pan speed data 223 and the tilt speed data 224 are data acquired when the mapping program 215 is executed, and indicate PT speed information obtained when the user operates the joystick 205 like in actual image capturing. This PT speed information indicates a PT speed range frequently used by the user during image capturing.

Figure 6:
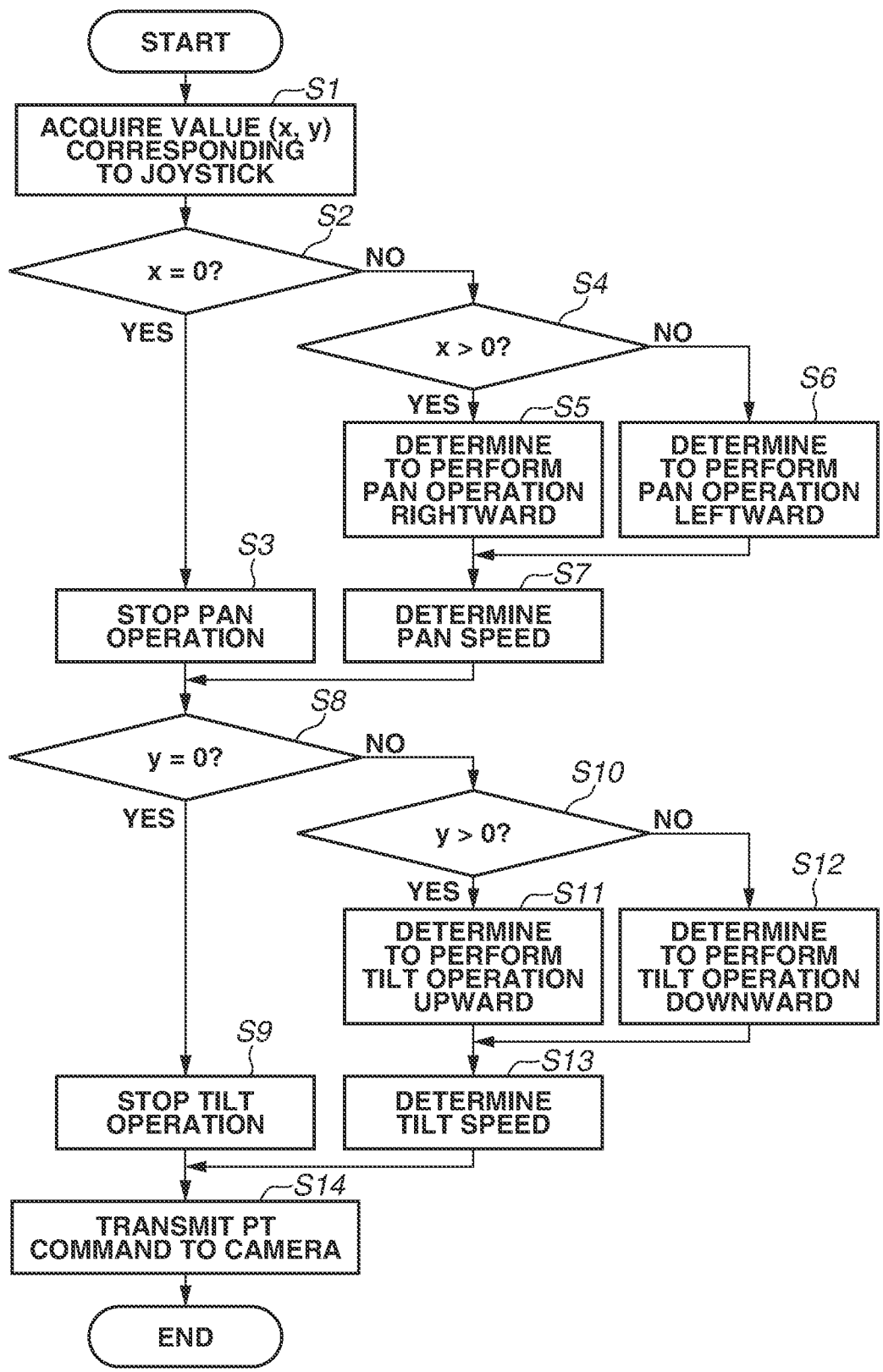
FIG. 6 is a flowchart illustrating an example of pan/tilt (PT) speed determination processing according to one or more aspects of the present disclosure.

FIG. 6 is a flowchart illustrating PT speed determination processing to be executed by the control apparatus 200.

The control apparatus 200 can implement the processing illustrated in FIG. 6 by the CPU 201 reading out and executing the PT speed determination program 214.

The PT speed determination program 214 is a program for determining the PT speed by looking up, in the table, the PT speed of the camera 100 corresponding to the amount of inclination of the joystick 205 when the joystick 205 is inclined and operated. This program is looped at regular intervals and the value corresponding to the joystick 205 is polled, thereby enabling the PT operation of the camera 100 based on the inclination of the joystick 205. Each step of the processing will be described.

In step S1, the control apparatus 200 acquires a value (x, y) corresponding to the joystick 205. Then, the processing proceeds to step S2.

In step S2, the control apparatus 200 determines whether the value x acquired in step S1 is "0". Specifically, the control apparatus 200 determines whether the joystick 205 is inclined in the horizontal direction. If it is determined that the value x is "0" (YES in step S2), the processing proceeds to step S3. If it is determined that the value x is not "0" (NO in step S2), the processing proceeds to step S4.

In step S3, the control apparatus 200 determines that the joystick 205 is not inclined in the horizontal direction, and determines to stop the pan operation of the camera 100. Then, the processing proceeds to step S8.

In step S4, the control apparatus 200 determines whether the value x is positive. In other words, the control apparatus 200 determines whether the joystick 205 is inclined rightward or leftward. If the value x is positive (YES in step S4), the processing proceeds to step S5. If the value x is negative (NO in step S4), the processing proceeds to step S6.

In step S5, the control apparatus 200 determines that the joystick 205 is inclined rightward, and determines to perform the pan operation of the camera 100 rightward. Then, the processing proceeds to step S7. On the other hand, in step S6, the control apparatus 200 determines that the joystick 205 is inclined leftward, and determines to perform the pan operation of the camera 100 leftward. Then, the processing proceeds to step S7.

In step S7, the control apparatus 200 looks up the X-axis table 221 and determines the pan speed corresponding to the value x of the joystick 205. Then, the processing proceeds to step S8.

In step S8, the control apparatus 200 determines whether the value y acquired in step S1 is "0". In other words, the control apparatus 200 determines whether the joystick 205 is inclined in the vertical direction. If the value y is "0" (YES in step S8), the processing proceeds to step S9. If the value y is not "0" (NO in step S8), the processing proceeds to step S10.

In step S9, the control apparatus 200 determines that the joystick 205 is not inclined in the vertical direction, and determines to stop the tilt operation of the camera 100. Then, the processing proceeds to step S14.

In step S10, the control apparatus 200 determines whether the value y is positive. In other words, the control apparatus 200 determines whether the joystick 205 is inclined upward or downward. If the value y is positive (YES in step S10), the processing proceeds to step S11. If the value y is negative (NO in step S10), the processing proceeds to step S12.

In step S11, the control apparatus 200 determines that the joystick 205 is inclined upward, and determines to perform the tilt operation of the camera 100 upward. Then, the processing proceeds to step S13. On the other hand, in step S12, the control apparatus 200 determines that the joystick 205 is inclined downward, and determines to perform the tilt operation of the camera 100 downward. Then, the processing proceeds to step S13.

In step S13, the control apparatus 200 looks up the Y-axis table 222 and determines the tilt speed corresponding to the value y of the joystick 205. Then, the processing proceeds to step S14.

In step S14, the control apparatus 200 transmits, based on the PT speed and the PT direction determined in the processing flow described above, a PT command to the camera 100, and then terminates the processing illustrated in FIG. 6.

Figure 7:
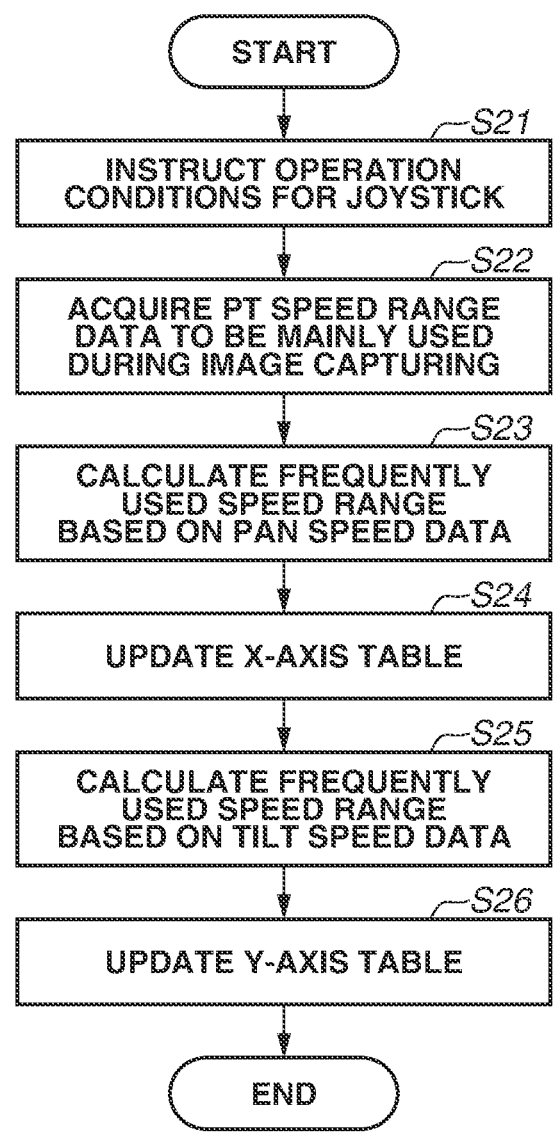
FIG. 7 is a flowchart illustrating an example of mapping processing according to one or more aspects of the present disclosure.

FIG. 7 is a flowchart illustrating mapping processing to be executed by the control apparatus 200.

The control apparatus 200 can implement the processing illustrated in FIG. 7 by the CPU 201 reading out and executing the mapping program 215.

The mapping program 215 is a program for calibrating the mapping of the X-axis table 221 and the Y-axis table 222. In the present exemplary embodiment, the mapping program 215 may be started with a user operation, such as a button operation, as a trigger, or may be automatically started, for example, at start-up of the control apparatus 200. Next, each step of the flowchart in FIG. 7 is described.

In step S21, the control apparatus 200 sends an instruction about operation conditions for the joystick 205 to the user. In the present exemplary embodiment, the control apparatus 200 sends an instruction indicating, for example, "Please execute camera work like in actual image capturing." to the user through the display device 206 or the like. This instruction is sent to prompt the user to perform the PT operation equivalent to the PT operation to be carried out in actual image capturing. In the PT operation performed in this case, default linear mapping tables are used as the X-axis table 221 and the Y-axis table 222. The use of these tables enables the user to perform the calibration operation in a state where the operation can be performed with a uniform easiness in the entire speed range.

In step S22, the control apparatus 200 acquires operation speed information about the camera 100 corresponding to an operation amount (x, y) of the joystick 205 when the joystick 205 is operated by the user following the instruction in step S21. More specifically, the control apparatus 200 refers to the default linear mapping tables, and acquires PT speed information corresponding to the operation amount (x, y) of the joystick 205. The data acquired in this case can be treated as data on the PT speed range to be actually used by the user during image capturing, that is, data on the PT speed range to be mainly used during image capturing. The control apparatus 200 stores the acquired data on the pan operation as the pan speed data 223, and stores the acquired data on the tilt operation as the tilt speed data 224.

In step S23, the control apparatus 200 calculates frequently used data in the pan speed data 223. In other words, the control apparatus 200 calculates the speed range frequently used by the user in the pan operation during image capturing. A method for calculating the frequently used speed range will be described below with reference to FIG. 8.

Next, in step S24, the control apparatus 200 performs mapping processing so that the frequently used speed range calculated in step S23 becomes more gradual, and updates the X-axis table 221. An image graph of mapping will be described below with reference to FIG. 9.

In step S25, the control apparatus 200 calculates frequently used data in the tilt speed data 224 by a method similar to that in step S23. In other words, the control apparatus 200 calculates the speed range frequently used by the user in the tilt operation during image capturing.

Next, in step S26, the control apparatus 200 performs mapping processing so that the frequently used speed range calculated in step S25 becomes more gradual by a method similar to that in step S24 and updates the Y-axis table 222, and then terminates the processing illustrated in FIG. 7. In the present exemplary embodiment, the Y-axis table 222 is updated after the X-axis table 221 is updated, but instead the Y-axis table 222 may be updated before the X-axis table 221 is updated.

The method for calculating the frequently used speed range in steps S23 and S25 illustrated in FIG. 7 will be described. The method for calculating the frequently used speed range in the pan operation in step S23 will now be described by way of example.

Figure 8:
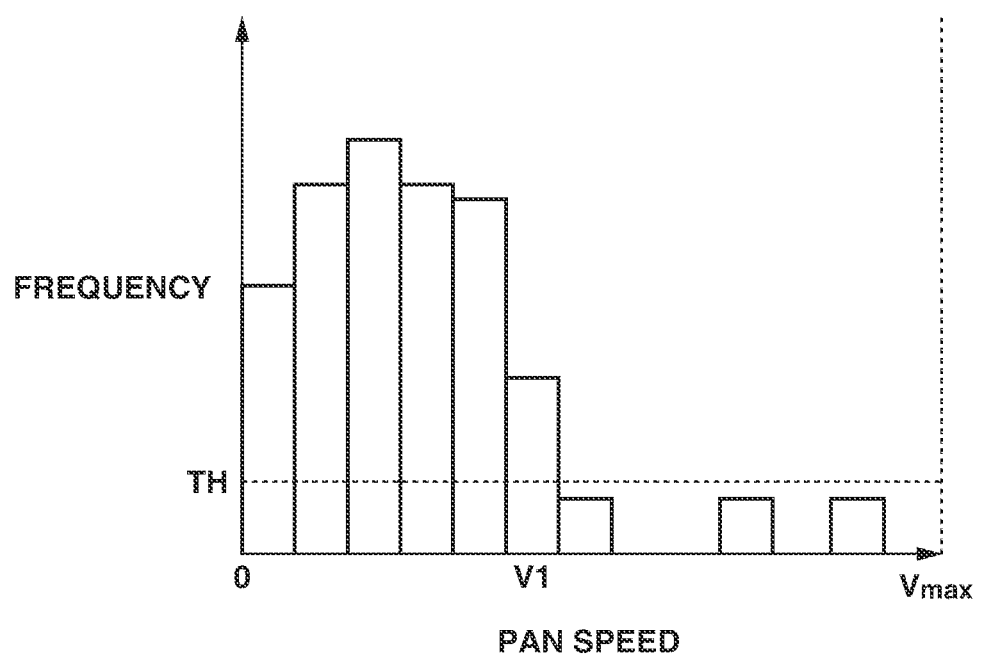
FIG. 8 is a graph illustrating an example of a histogram of pan speed data according to one or more aspects of the present disclosure.

FIG. 8 is an image graph illustrating an example of a graph obtained by converting the pan speed data 223 into a histogram. The vertical axis represents the frequency, and the horizontal axis represents the pan speed. In FIG. 8, $v_{max}$ represents a maximum value of the pan speed of the camera 100. A method for obtaining the frequency for each block when a certain range of the pan speed is used as one block will now be described.

A dashed line in FIG. 8 represents a predetermined threshold TH based on which the frequently used speed range is determined. In the pan speed data 223 illustrated in FIG. 8, the use frequency is higher than the predetermined threshold TH in a pan speed range from 0 to v1. Accordingly, it can be determined that this speed range corresponds to the frequently used speed range.

Thus, in steps S23 and S25 illustrated in FIG. 7, the control apparatus 200 compares the histogram for speed data with the threshold, thereby making it possible to calculate the operation speed range frequently used by the user.

Figure 9:
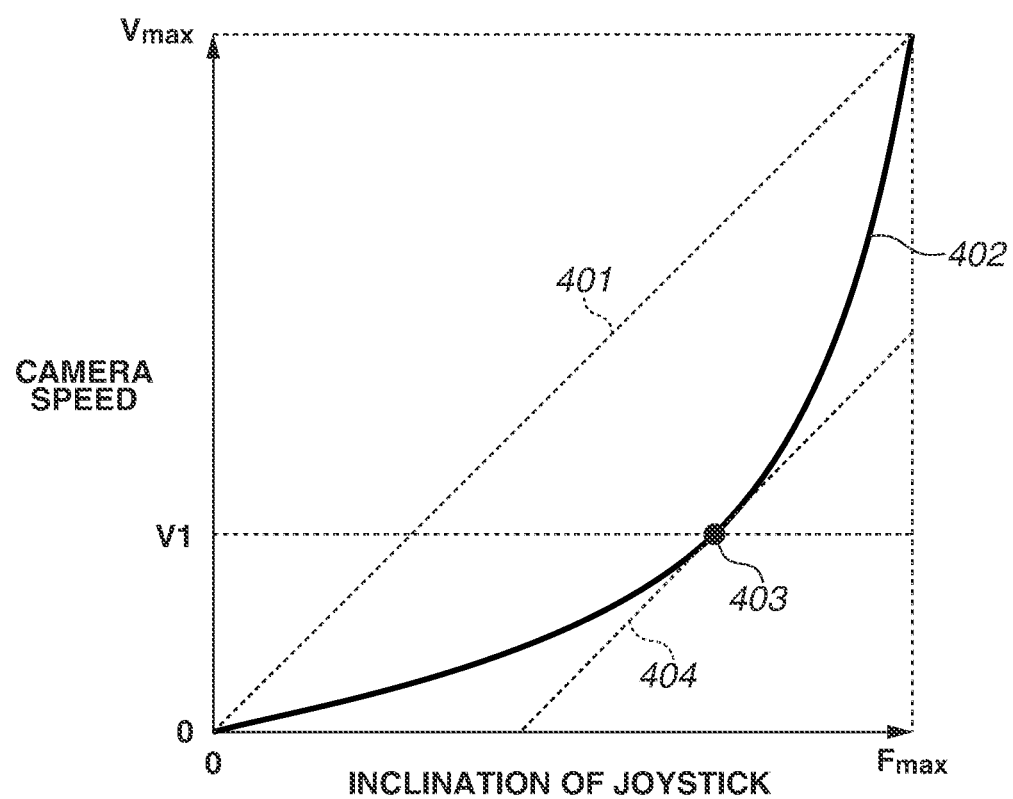
FIG. 9 is a graph illustrating an example of mapping processing according to one or more aspects of the present disclosure.

FIG. 9 is an image graph illustrating a table obtained by performing mapping processing so that the inclination of the joystick 205 in the speed range frequently used by the user becomes more gradual in steps S24 and S26 illustrated in FIG. 7.

In FIG. 9, $V_{max}$ represents a maximum value of the turning speed of the camera 100. In other words, the maximum value $V_{max}$ corresponds to the maximum value $v_{max}$ of the pan speed in the mapping of the X-axis table 221, and the maximum value $V_{max}$ corresponds to the maximum value of the tilt speed in the mapping of the Y-axis table 222. In FIG. 9, $F_{max}$ represents a maximum value of the inclination of the joystick 205. In other words, the maximum value $F_{max}$ corresponds to the maximum value of the inclination in the X-axis direction of the joystick 205 in the mapping of the X-axis table 221, and the maximum value $F_{max}$ corresponds to the maximum value of the inclination in the Y-axis of the joystick 205 in the mapping of the Y-axis table 222.

In this case, a camera speed V1 is a threshold corresponding to a boundary between the frequently used speed range and the less frequently used speed range. In the example illustrated in FIG. 9, the speed range lower than the camera speed V1 corresponds to the frequently used speed range, and the speed range higher than the camera speed V1 corresponds to the less frequently used speed range. The camera speed V1 corresponds to the pan speed v1 illustrated in FIG. 8 in the mapping of the X-axis table 221.

A dashed straight line 401 illustrated in FIG. 9 represents the mapping of the table that is not updated yet. A solid curve 402 illustrated in FIG. 9 represents the mapping of the updated table. The curve 402 represents a quadratic function that passes through an origin (0, 0), a point 403, and coordinates ($F_{max}$, $V_{max}$).

In this case, the point 403 is a point at which the camera speed is V1 on the curve 402 and the inclination of a tangent 404 to the curve 402 matches the inclination of the straight line 401. In other words, the curve 402 is characterized in that the inclination of the curve 402 in a portion lower than the point 403 is gradual, and the inclination of the curve 402 in a portion higher than the point 403 is steep.

In this way, in steps S24 and S26 illustrated in FIG. 7, the control apparatus 200 performs mapping processing so that the speed range frequently used in the PT operation during image capturing becomes more gradual, and updates the X-axis table 221 and the Y-axis table 222.

As described above, the control apparatus 200 acquires data indicating characteristics of a user operation on the joystick 205 serving as the input device. Further, the control apparatus 200 creates a table in which the operation amount of the joystick 205 is associated with the operation speed of the camera 100 based on the acquired data. In this case, the operation speed of the camera 100 is at least one of the speed in the pan direction and the speed in the tilt direction. The control apparatus 200 refers to the above-described tables, determines the PT speed of the camera 100 corresponding to the amount of inclination of the joystick 205 by the user based on the amount of inclination of the joystick 205, and causes the camera 100 to operate at the determined PT speed.

In this way, the control apparatus 200 can perform mapping of the amount of inclination of the joystick 205 and the PT speed of the camera 100 in consideration of the characteristics of the operation on the joystick 205 by each user. Accordingly, the user-friendliness of the joystick 205 can be enhanced.

In the case of acquiring data indicating the characteristics of the user operation on the joystick 205, the control apparatus 200 sends an instruction about operation conditions for the joystick 205 to the user. Then, the control apparatus 200 acquires information about the amount of inclination of the joystick 205 when the user operates the joystick 205 according to the operation conditions, as the data indicating the characteristics of the user operation on the joystick 205. Accordingly, even when the joystick operation is performed differently by each user, the difference in the joystick operation can be easily grasped.

Specifically, the control apparatus 200 acquires operation speed information (PT speed information) about the camera 100 corresponding to the amount of inclination of the joystick 205 when the user operates the joystick 205 like in actual image capturing according to the operation conditions. Accordingly, the control apparatus 200 can easily grasp the speed range to be mainly used by the user during image capturing based on the acquired PT speed information.

The control apparatus 200 can easily calculate the speed range used by the user at a use frequency higher than the predetermined threshold TH as illustrated in FIG. 8 based on the acquired PT speed information. Accordingly, the control apparatus 200 can easily perform the mapping illustrated in FIG. 9. More specifically, the control apparatus 200 can perform mapping processing so that the inclination in the speed range (speed range from 0 to V1) used at a use frequency higher than the threshold TH becomes smaller than the inclination in the speed range (speed range from V1 to $V_{max}$) used at a use frequency lower than the threshold TH. The use of the table created as described above enables the user to easily adjust the speed in the speed range to be mainly used during image capturing.

In this manner, the control apparatus 200 according to the present exemplary embodiment can change the mapping for each user. Consequently, it is possible to enhance the user-friendliness without the need for the user to perform the operation based on a predetermined operation feeling.

The present exemplary embodiment illustrates an example where the frequently used speed range is located in a low speed range as illustrated in FIG. 8. Accordingly, in the mapping corresponding to the example illustrated in FIG. 8, the inclination in the low speed range is gradual and the inclination in the high speed range is steep as illustrated in FIG. 9. However, the curve of the mapping is not limited to a quadratic function curve.

For example, if the frequently used speed range is present in both the low speed range and the high speed range, the inclination in the low speed range and the inclination in the high speed range can be made gradual when the mapping is performed using a sigmoid function curve. In another example, if the frequently used speed range is present in a middle speed range, the inclination in the middle speed range can be made gradual when the mapping is performed using a tangent curve.

Next, a second exemplary embodiment of the present invention will be described.

The first exemplary embodiment described above illustrates a case where two types of tables, i.e., the table for operation in the vertical direction and the table for operation in the horizontal direction, are used as PT speed tables. The second exemplary embodiment illustrates a case where a table for an upward operation, a table for a downward operation, a table for a leftward operation, and a table for a rightward operation are used as PT speed tables.

Figure 10:
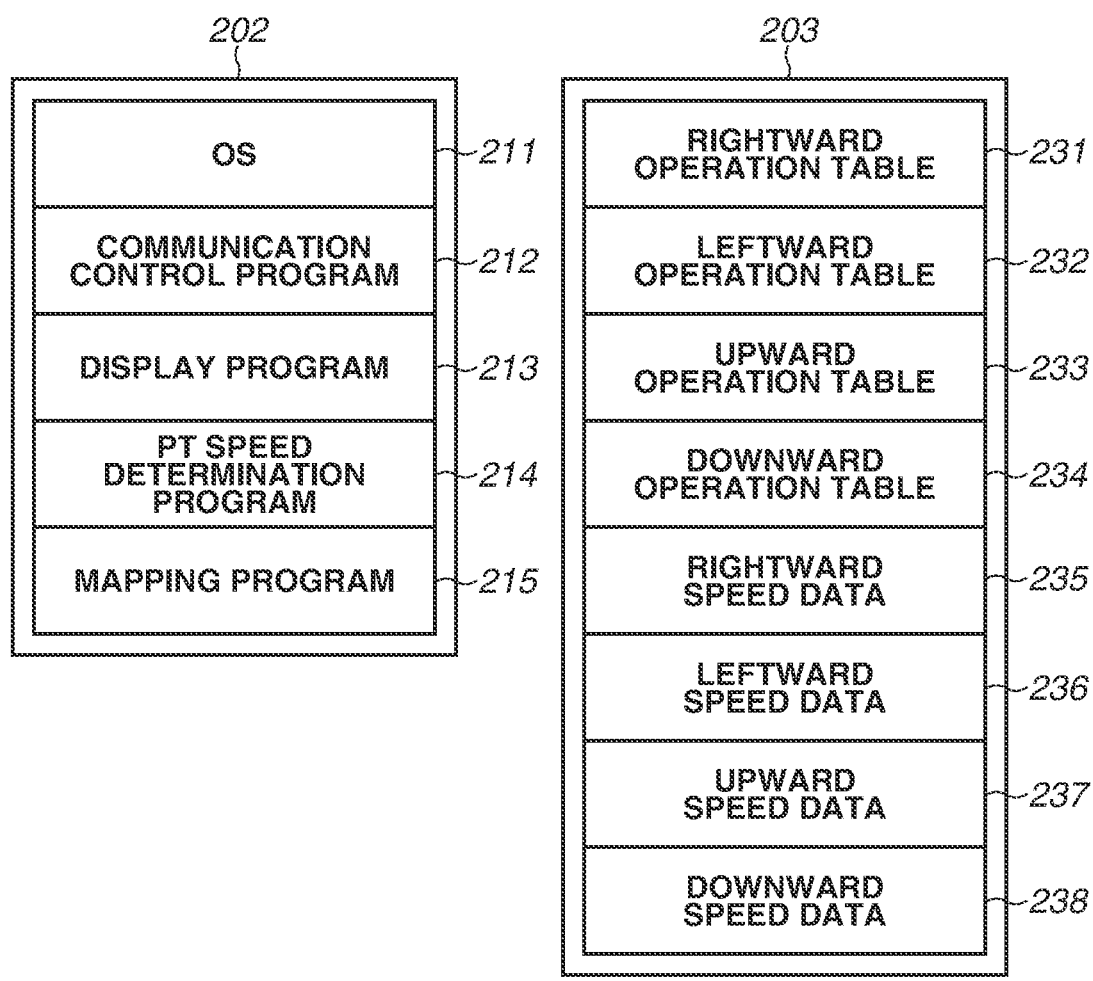
FIG. 10 is a block diagram illustrating a configuration example of a storage device of a control apparatus according to one or more aspects of the present disclosure.

FIG. 10 illustrates examples of various programs and various data stored in the primary storage device 202 and the secondary storage device 203 of the control apparatus 200 according to the present exemplary embodiment. Various programs stored in the primary storage device 102 are similar to those of the first exemplary embodiment described above, and thus the descriptions thereof are omitted.

The secondary storage device 203 stores a rightward operation table 231, a leftward operation table 232, an upward operation table 233, a downward operation table 234, rightward speed data 235, leftward speed data 236, upward speed data 237, and downward speed data 238.

The various tables 231 to 234 are tables for the rightward, leftward, upward, and downward operations of the joystick 205.

A table is created for each inclination direction of the joystick 205, thereby making it possible to perform suitable mapping for each operation, for example, even when there is a difference in the frequently used speed range between a rightward pan operation and a leftward pan operation. The various tables 231 to 234 are tables obtained by linearly mapping the relationship between the amount of inclination of the joystick 205 and the PT speed of the camera 100 by default.

The various speed data 235 to 238 are data acquired when the mapping program 215 is executed, and indicate PT speed information obtained when the user is caused to operate the joystick 205 like in actual image capturing. In the present exemplary embodiment, speed data on the upward operation, speed data on the downward operation, speed data on the leftward operation, and speed data on the rightward operation are held separately.

Figure 11:
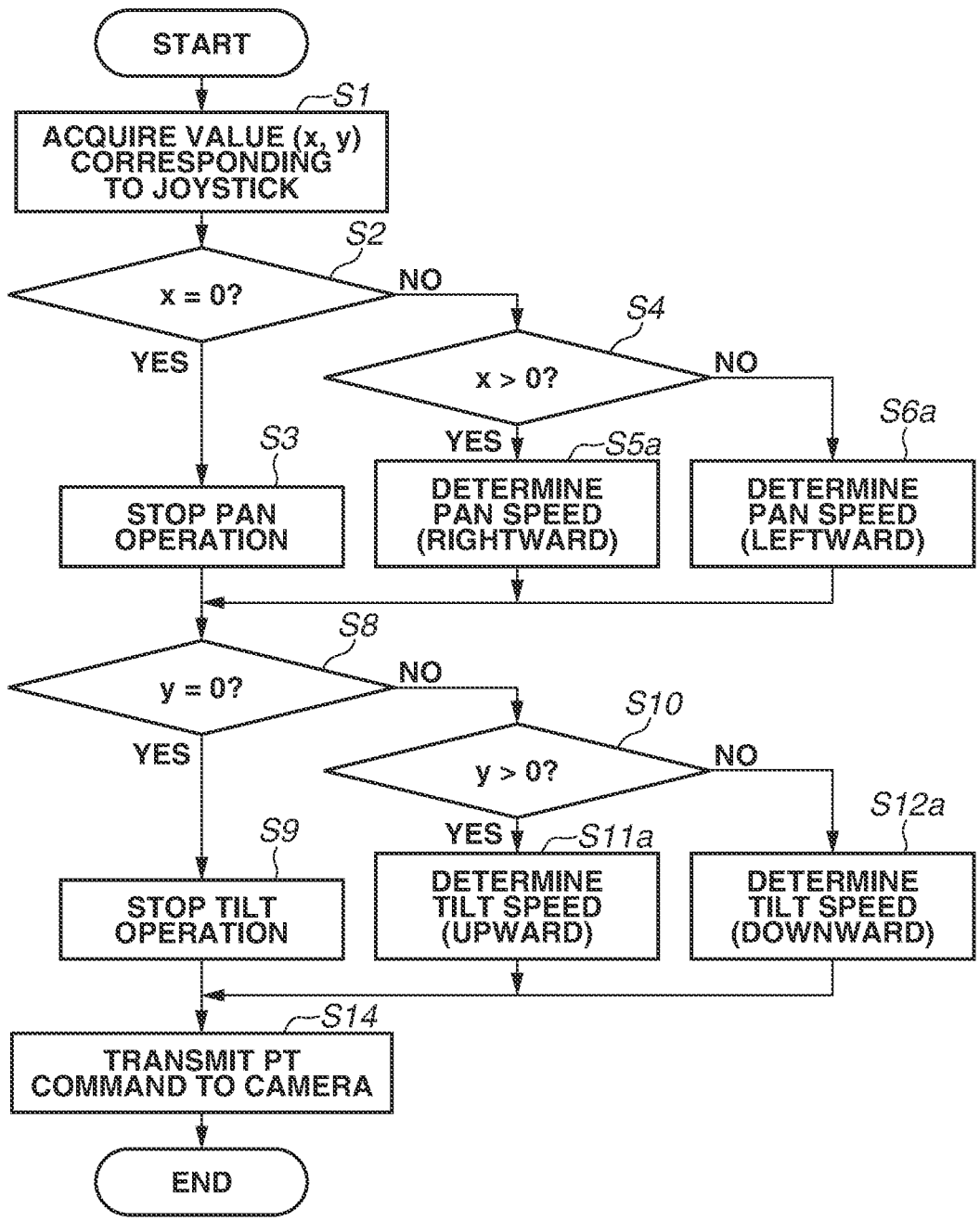
FIG. 11 is a flowchart illustrating an example of PT speed determination processing according to one or more aspects of the present disclosure.

FIG. 11 is a flowchart illustrating PT speed determination processing to be executed by the control apparatus 200 according to the present exemplary embodiment. In FIG. 11, steps of performing the same processing as that illustrated in FIG. 6 are denoted by the same step numbers as that illustrated in FIG. 6. Steps in the processing illustrated in FIG. 11 that are different from steps in the processing illustrated in FIG. 6 will be mainly described below.

If the control apparatus 200 determines that the value x is positive in step S4 (YES in step S4), the processing proceeds to step S5a. In step S5a, the control apparatus 200 determines that the joystick 205 is inclined rightward, and determines to perform the pan operation of the camera 100 rightward. Then, the control apparatus 200 looks up the rightward operation table 231 and determines the pan speed corresponding to the value x of the joystick 205. Then, the processing proceeds to step S8.

If the control apparatus 200 determines that the value x is negative in step S4 (NO in step S4), the processing proceeds to step S6a. In step S6a, the control apparatus 200 determines that the joystick 205 is inclined leftward, and determines to perform the pan operation of the camera 100 leftward. Then, the control apparatus 200 looks up the leftward operation table 232 and determines the pan speed corresponding to the value x of the joystick 205. Then, the processing proceeds to step S8.

Similarly, if the control apparatus 200 determines that the value y is positive in step S10 (YES in step S10), the processing proceeds to step S11a. In step S11a, the control apparatus 200 determines that the joystick 205 is inclined upward, and determines to perform the tilt operation of the camera 100 upward. Then, the control apparatus 200 looks up the upward operation table 233 and determines the tilt speed corresponding to the value y of the joystick 205. Then, the processing proceeds to step S14.

If the control apparatus 200 determines that the value y is negative in step S10 (NO in step S10), the processing proceeds to step S12a. In step S12a, the control apparatus 200 determines that the joystick 205 is inclined downward, and determines to perform the tilt operation of the camera 100 downward. Then, the control apparatus 200 looks up the downward operation table 234 and determines the tilt speed corresponding to the value y of the joystick 205. Then, the processing proceeds to step S14.

In this way, since the tables for the upward operation, the downward operation, the leftward operation, and the rightward operation are separately held in the present exemplary embodiment, the PT speed is determined by looking up the corresponding table depending on the inclination direction of the joystick 205.

Figure 12:
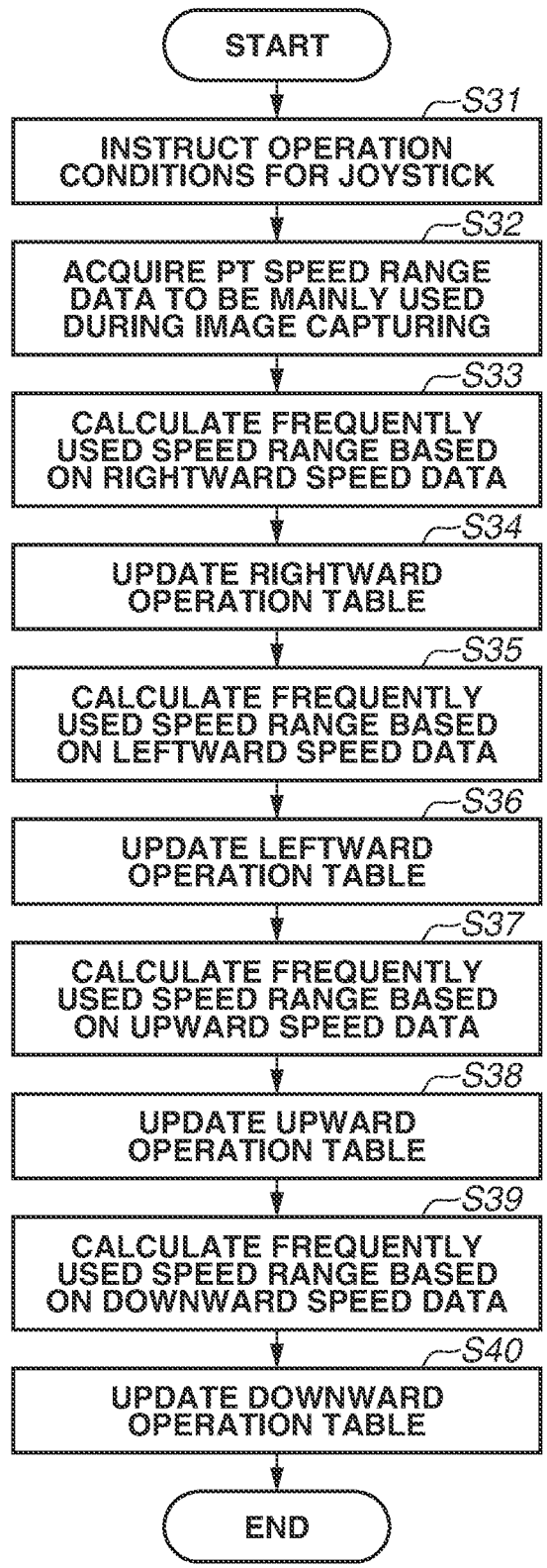
FIG. 12 is a flowchart illustrating an example of mapping processing according to one or more aspects of the present disclosure.

FIG. 12 is a flowchart illustrating mapping processing to be executed by the control apparatus 200 according to the present exemplary embodiment.

The control apparatus 200 can implement the processing illustrated in FIG. 12 by the CPU 201 reading out and executing the mapping program 215.

The mapping program 215 is a program for calibrating the mapping of the rightward operation table 231, the leftward operation table 232, the upward operation table 233, and the downward operation table 234. In the present exemplary embodiment, the mapping program 215 may be started with a user operation, such as a button operation, as a trigger, or may be automatically started, for example, at a start-up of the control apparatus 200. Each step of the processing will be described.

In step S31, the control apparatus 200 sends an instruction indicating, for example, "Please execute camera work like in actual image capturing." to the user through the display device 206 or the like, like in step S21 illustrated in FIG. 7.

In step S32, the control apparatus 200 acquires PT speed information corresponding to the value (x, y) of the joystick 205 operated by the user in response to the instruction in step S31, like in step S22 illustrated in FIG. 7. Further, the control apparatus 200 stores data on the rightward pan operation form the acquired data as the rightward speed data 235, and stores data on the leftward pan operation from the acquired data as the leftward speed data 236. Further, the control apparatus 200 stores data on the upward tilt operation in the acquired data as the upward speed data 237, and stores data on the downward tilt operation in the acquired data as the downward speed data 238.

In step S33, the control apparatus 200 calculates frequently used data from the rightward speed data 235. More specifically, the control apparatus 200 calculates the frequently used speed range used by the user in the rightward pan operation during image capturing. A method for calculating the frequently used speed range is similar to that described above in the first exemplary embodiment.

Next, in step S34, the control apparatus 200 performs mapping processing so that the inclination in the frequently used speed range calculated in step S33 becomes more gradual, and updates the rightward operation table 231. An image graph of mapping is similar to that described above in the first exemplary embodiment.

In step S35, the control apparatus 200 calculates frequently used data in the leftward speed data 236, like in step S33. More specifically, the control apparatus 200 calculates the frequently used speed range used by the user in the leftward pan operation during image capturing.

Next, in step S36, the control apparatus 200 performs mapping processing so that the inclination in the frequently used speed range calculated in step S35 becomes more gradual, and updates the leftward operation table 232, like in step S34.

Similarly, in step S37, the control apparatus 200 calculates frequently used data in the upward speed data 237. More specifically, the control apparatus 200 calculates the frequently used speed range used by the user in the upward tilt operation during image capturing.

Next, in step S38, the control apparatus 200 performs mapping processing so that the inclination in the frequently used speed range calculated in step S37 becomes more gradual, and updates the upward operation table 233.

In step S39, the control apparatus 200 calculates frequently used data in the downward speed data 238. More specifically, the control apparatus 200 calculates the frequently used speed range used by the user in the downward tilt operation during image capturing.

Next, in step S40, the control apparatus 200 performs mapping processing so that the inclination in the frequently used speed range calculated in step S39 becomes more gradual, and updates the downward operation table 234.

In the present exemplary embodiment, the rightward operation table 231, the leftward operation table 232, the upward operation table 233, and the downward operation table 234 are updated in this order. However, the updating order is not limited to the above-described order.

As described above, the control apparatus 200 according to the present exemplary embodiment can create a table for each inclination direction of the joystick 205. As a result, when the joystick 205 is configured to perform an upward operation, a downward operation, a leftward operation, and a rightward operation, mapping suitable for each of the upward operation, the downward operation, the leftward operation, and the rightward operation can be performed. Therefore, the user-friendliness can be enhanced.

Modified Examples

The exemplary embodiments described above illustrate a case where mapping for the joystick 205 is performed by acquiring the PT speed information obtained by causing the user to execute camera work like in actual image capturing as data indicating characteristics of a user operation on the joystick 205. However, the calibration method is not limited to the above-described method. For example, an optimum PT operation speed range to be used within the angle of view of the camera 100 may be calculated based on the distance between the camera 100 and an object, a zoom position, or the like, and mapping may be performed so that a change in the PT speed becomes more gradual in the speed range calculated as the speed range to be used by the user.

Further, the amount of inclination of the joystick 205 when the user is caused to operate the joystick 205 to revolve once with a certain inclination may be acquired, and a difference in the degree of inclination of the joystick 205 in the upward, downward, leftward, and rightward directions may be evaluated. In this case, the control apparatus 200 sends an instruction indicating, for example, "Please revolve the joystick in a state where the joystick is inclined at a certain angle." to the user through the display device 206 or the like. Then, the tables for the upward operation, the downward operation, the leftward operation, and the rightward operation are calibrated based on the difference in the degree of inclination of the joystick 205. In this way, the mapping can be performed without causing a sense of discomfort in the upward, downward, leftward, and rightward directions in consideration of, for example, the user's individual way of inclining the joystick 205. The difference in the degree of inclination of the joystick 205 may be evaluated by causing the user to revolve the joystick 205 a plurality of times (e.g., three times) and taking an average value of the amounts of inclination in the upward, downward, leftward, and rightward directions. Alternatively, instead of revolving the joystick 205, for example, an instruction indicating "Please incline the joystick at the same degree of inclination in the upward, downward, leftward, and rightward directions." may be sent. Further, the ease of adjusting the application of a force to the joystick 205 in the horizontal direction varies depending on whether the user is right-handed or left-handed. Accordingly, data indicating that the user is right-handed or left-handed may be acquired as data indicating characteristics of a user operation on the joystick 205.

Further, a video image captured when the user is caused to turn the camera 100 at a predetermined speed may be presented to the user, and the user may be caused to incline the joystick 205 so as to match the sense of the turning speed of the video image, thereby calibrating the corresponding table. In this case, the control apparatus 200 sends an instruction indicating, for example, "The camera is operated at a certain speed [°/s]. Please keep the joystick at the position corresponding to the sense of the speed of the video image while viewing the video image." to the user through the display device 206 or the like. This method enables an appropriate mapping that matches the user's sense.

The video image presented to the user is not limited to the video image captured by actually turning the camera 100. More specifically, a video image obtained by a camera that moves at the corresponding speed may be prepared in advance and the video image may be presented to the user.

Further, in the above-described exemplary embodiments, the joystick 205 is not limited to a two-axis joystick, but instead may be a one-axis joystick. In other words, the operation to be controlled by operating the joystick 205 may be one of the operation in the pan direction of the camera 100 and the operation in the tilt direction of the camera 100.

Furthermore, the above-described exemplary embodiments illustrate a case where the operation for an object to be operated is the PT operation of the camera 100 and a joystick is used as the input device 205 that controls the operation for the object to be operated. However, the operation for the object to be operated is not limited to the PT operation of the camera 100, and may be, for example, a movement of a cursor or a movement of a character. The input device 205 is not limited to a joystick, but instead may be any input device whose operation amount can be adjusted to control the operation speed of the object to be operated.

In a system of operating a cursor using a joystick, for example, the user may be caused to operate the cursor using the joystick to track a target moving at a predetermined speed on a monitor so that the tracking performance in each speed range can be evaluated. In this case, in a speed range in which the tracking performance is poor, mapping processing can be performed so that a change in the operation speed of the cursor with respect to a change in the operation amount of the joystick becomes more gradual.

Other Embodiments

The present invention can also be implemented by processing in which a program for implementing one or more functions according to the above-described exemplary embodiments is supplied to a system or an apparatus via a network or a storage medium, and one or more processors in a computer of the system or the apparatus read out and execute the program. The present invention can also be implemented by a circuit (e.g., an application specific integrated circuit (ASIC)) for implementing one of more functions according to the exemplary embodiments.

According to the exemplary embodiments described above, it is possible to perform an appropriate mapping of an operation amount of an input device and an operation speed of an object to be operated in consideration of characteristics of an operation on the input device by each user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-090278, filed May 25, 2020, which is hereby incorporated by reference herein in its entirety.

What is claimed is:

1. An information processing apparatus comprising a computer executing instructions that, when executer by the computer, causes the computer to:
   acquire first mapping information in which an amount of inclination of a joystick, used for controlling an image capturing direction, and a change speed in the image capturing direction of an image capturing apparatus are associated;
   determine the change speed in the image capturing direction, based on the amount of inclination of the joystick by a user operation and the first mapping information; and
   generate second mapping information in which the amount of inclination of the joystick and the change speed in the image capturing direction are associated, based on the determined change speed in the image capturing direction.

2. The information processing apparatus according to claim 1, wherein the instructions further causes the computer to determine, after the second mapping information is generated, the change speed in the image capturing direction based on the amount of inclination of the joystick by the user operation and the second mapping information.

3. The information processing apparatus according to claim 1, wherein the instructions further cause the computer to execute processing for controlling the image capturing direction of the image capturing apparatus based on the determined change speed.

4. The information processing apparatus according to claim 1, wherein the instructions further cause the computer to identify the change speed used by a user at a use frequency more than or equal to a threshold, based on the determined change speed in the image capturing direction during a predetermined period, and to generate the second mapping information based on the identified change speed.

5. The information processing apparatus according to claim 1, wherein the image capturing apparatus is configured to change the image capturing direction in a pan direction and a tilt direction, wherein the first mapping information includes first pan mapping information used to determine the change speed in the image capturing direction of the pan direction, and first tilt mapping information used to determine the change speed in the image capturing direction of the tilt direction, and wherein the instructions further cause the computer to determine the change speed in the image capturing direction of the pan direction and the change speed in the image capturing direction of the tilt direction, based on the amount of inclination and an inclination direction of the joystick operated by a user and the first pan mapping information and the first tilt mapping information included in the first mapping information.

6. The information processing apparatus according to claim 5, wherein the instructions further cause the computer to generate the second mapping information including second pan mapping information used to determine the change speed in the image capturing direction of the pan direction and second tilt mapping information used to determine the change speed in the image capturing direction of the tilt direction, based on the determined change speed in the image capturing direction of the pan direction and the determined change speed in the image capturing direction of the tilt direction during a predetermined period.

7. The information processing apparatus according to claim 1, wherein the second mapping information is generated based on a frequency of each of the determined change speed in the image capturing direction during a predetermined period.

8. The information processing apparatus according to claim 1, wherein the instructions further cause the computer to identify, based on the determined change speed in the image capturing direction during a predetermined period, a first speed range of a change speed in the image capturing direction, a usage frequency of the first speed range being higher than a usage frequency of a second speed range of a change speed in the image capturing direction.

9. The information processing apparatus according to claim 8, wherein the second mapping information is generated based on the first speed range.

10. The information processing apparatus according to claim 8, wherein the second mapping information corresponds to a graph which includes an X-axis corresponding to an amount of inclination of the joystick and a Y-axis corresponding to a change speed in the image capturing direction, and wherein the second mapping information is generated such that a slope in the first speed range in the graph is more gradual compared to a slope in the second speed range different from the first speed range in the graph.

11. An information processing method comprising:

acquiring first mapping information in which an amount of inclination of a joystick, used for controlling an image capturing direction, and a change speed in the image capturing direction of an image capturing apparatus are associated;

determining the change speed in the image capturing direction based on the amount of inclination of the joystick by a user operation and the first mapping information; and generating second mapping information as information in which the amount of inclination of the joystick and the change speed in the image capturing direction are associated, based on the determined change speed in the image capturing direction.

12. A non-transitory computer readable storage medium storing a program for causing a computer to execute an information processing method, the information processing method comprising:

acquiring first mapping information in which an amount of inclination of a joystick, used for controlling an image capturing direction, and a change speed in the image capturing direction of an image capturing apparatus are associated;

determining the change speed in the image capturing direction based on the amount of inclination of the joystick by a user operation and the first mapping information; and generating second mapping information as information in which the amount of inclination of the joystick and the change speed in the image capturing direction are associated, based on the determined change speed in the image capturing direction.

* * * * *